(12) United States Patent
Tang et al.

(10) Patent No.: US 8,310,770 B2
(45) Date of Patent: Nov. 13, 2012

(54) PHOTOGRAPHING OPTICAL SYSTEM

(75) Inventors: Hsiang Chi Tang, Taichung (TW);
Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 247 days.

(21) Appl. No.: 12/854,535

(22) Filed: Aug. 11, 2010

(65) Prior Publication Data
US 2011/0228157 A1    Sep. 22, 2011

(30) Foreign Application Priority Data
Mar. 16, 2010    (TW) ................................ 99107598 A

(51) Int. Cl.
G02B 9/12    (2006.01)
G02B 13/18    (2006.01)
G02B 3/02    (2006.01)
(52) U.S. Cl. ........................................ 359/784; 359/716
(58) Field of Classification Search .................. 359/784, 359/785, 716, 748
See application file for complete search history.

(56) References Cited

U.S. PATENT DOCUMENTS 7,525,741 B1    4/2009 Noda
7,564,635 B1    7/2009 Tang
7,830,622 B2 *  11/2010 Shinohara ..................... 359/784

FOREIGN PATENT DOCUMENTS

JP    2005-308800 A    11/2005

* cited by examiner

*Primary Examiner* — Alicia M Harrington
(74) *Attorney, Agent, or Firm* — Morris, Manning & Martin, LLP; Tim Tingkang Xia, Esq.

(57) ABSTRACT

This invention provides a photographing optical system comprising: in order from an object side to an image side: a first lens with positive refractive power having a convex object-side surface; a second lens with negative refractive power having a convex object-side surface and a concave image-side surface, at least one of the object-side and image-side surfaces thereof being aspheric; a third lens having at least one inflection point formed thereon and both surfaces thereof being aspheric. A stop is positioned between an imaged object and the first lens element. The photographing optical system further comprises an electronic sensor on which an object is imaged, and there are three lens elements of the photographing optical system with refractive power.

25 Claims, 16 Drawing Sheets

| TABLE 1 | | | | | | | |
|---|---|---|---|---|---|---|---|
| (Embodiment 1) | | | | | | | |
| f = 3.36 mm, Fno = 2.78, HFOV = 33.6 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | 0.022 | | | | |
| 2 | Lens 1 | 1.36265 (ASP) | 0.480 | Plastic | 1.544 | 55.9 | 3.82 |
| 3 | | 3.45990 (ASP) | 0.499 | | | | |
| 4 | Lens 2 | 1.94327 (ASP) | 0.300 | Plastic | 1.632 | 23.4 | -11.51 |
| 5 | | 1.44185 (ASP) | 0.554 | | | | |
| 6 | Lens 3 | 1.92127 (ASP) | 1.089 | Plastic | 1.544 | 55.9 | 12.21 |
| 7 | | 2.16291 (ASP) | 0.500 | | | | |
| 8 | IR-filter | Plano | 0.300 | Glass | 1.517 | 64.2 | - |
| 9 | | Plano | 0.220 | | | | |
| 10 | Image | Plano | - | | | | |

Fig. 11

| TABLE 2 | | | | | | |
|---|---|---|---|---|---|---|
| Aspheric Coefficients | | | | | | |
| Surface # | 2 | 3 | 4 | 5 | 6 | 7 |
| k = | -2.97140E-01 | -9.33275E+00 | -3.95665E+01 | -1.83941E+01 | -9.41382E+00 | -6.01666E+00 |
| A4 = | -4.52549E-03 | -3.04438E-02 | 9.20648E-02 | 6.26690E-02 | -1.12702E-01 | -6.00590E-02 |
| A6 = | 1.50621E-02 | 4.90625E-02 | -1.45786E-01 | 6.33366E-02 | 4.10551E-02 | 6.89419E-03 |
| A8 = | -1.25735E-01 | -3.26263E-01 | -4.12419E-01 | -2.11774E-01 | -6.21507E-03 | -1.18237E-03 |
| A10= | 6.33495E-02 | 1.38444E-01 | 8.55115E-01 | 1.15463E-01 | 4.01905E-04 | 1.04001E-05 |
| A12= | | | -8.04693E-01 | | | |

Fig. 12

| TABLE 3 | | | | | | |
|---|---|---|---|---|---|---|
| (Embodiment 2) | | | | | | |
| f= 3.37 mm, Fno = 2.45, HFOV = 33.5 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.135 | | | | |
| 2 | Lens 1 | 1.36933 (ASP) | 0.459 | Plastic | 1.544 | 55.9 | 3.65 |
| 3 | | 3.89150 (ASP) | 0.618 | | | | |
| 4 | Lens 2 | 1.93882 (ASP) | 0.300 | Plastic | 1.632 | 23.4 | -10.52 |
| 5 | | 1.41099 (ASP) | 0.496 | | | | |
| 6 | Lens 3 | 2.24671 (ASP) | 1.113 | Plastic | 1.583 | 32.0 | 15.77 |
| 7 | | 2.43092 (ASP) | 0.500 | | | | |
| 8 | IR-filter | Plano | 0.300 | Glass | 1.517 | 64.2 | - |
| 9 | | Plano | 0.158 | | | | |
| 10 | Image | Plano | - | | | | |

Fig. 13

| TABLE 4 | | | | | | |
|---|---|---|---|---|---|---|
| Aspheric Coefficients | | | | | | |
| Surface # | 2 | 3 | 4 | 5 | 6 | 7 |
| k = | -4.35229E-01 | -1.50927E+01 | -3.26337E+01 | -1.65670E+01 | -1.68093E+01 | -1.12952E+01 |
| A4 = | -1.15013E-02 | -4.05939E-02 | 7.15224E-03 | 6.66787E-03 | -1.15229E-01 | -5.22133E-02 |
| A6 = | 3.54133E-02 | 5.52987E-02 | -1.21595E-02 | 1.02342E-01 | 3.95507E-02 | 3.56964E-03 |
| A8 = | -1.41017E-01 | -2.74054E-01 | -5.02748E-01 | -2.12580E-01 | -5.76442E-03 | -1.37957E-03 |
| A10= | 1.77212E-02 | 6.04379E-02 | 8.25433E-01 | 1.01172E-01 | 5.83210E-04 | 9.77493E-05 |
| A12= | | | -7.31969E-01 | | | |

Fig. 14

| TABLE 5 | | | | | | | |
|---|---|---|---|---|---|---|---|
| (Embodiment 3) | | | | | | | |
| f = 3.48 mm, Fno = 2.80, HFOV= 32.8 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.002 | | | | |
| 2 | Lens 1 | 1.36653 (ASP) | 0.623 | Plastic | 1.544 | 55.9 | 3.46 |
| 3 | | 4.18160 (ASP) | 0.400 | | | | |
| 4 | Lens 2 | 2.09755 (ASP) | 0.280 | Plastic | 1.632 | 23.4 | -14.86 |
| 5 | | 1.62606 (ASP) | 0.523 | | | | |
| 6 | Lens 3 | 3.32330 (ASP) | 1.250 | Plastic | 1.530 | 55.8 | -34.23 |
| 7 | | 2.44278 (ASP) | 0.500 | | | | |
| 8 | IR-filter | Plano | 0.300 | Glass | 1.517 | 64.2 | - |
| 9 | | Plano | 0.088 | | | | |
| 10 | Image | Plano | - | | | | |

Fig. 15

| TABLE 6 | | | | | | |
|---|---|---|---|---|---|---|
| Aspheric Coefficients | | | | | | |
| Surface # | 2 | 3 | 4 | 5 | 6 | 7 |
| k = | -3.91516E-01 | -2.18811E+01 | -4.47173E+01 | -2.05945E+01 | -3.03520E+01 | -1.50430E+01 |
| A4 = | 8.65258E-04 | -6.14446E-02 | 6.61885E-02 | 6.35508E-02 | -1.65980E-01 | -2.32749E-02 |
| A6 = | -7.37756E-02 | -2.31039E-02 | -2.11158E-01 | 4.01204E-02 | 7.06370E-02 | -2.09275E-02 |
| A8 = | 1.73924E-01 | -2.33424E-01 | -6.17166E-01 | -2.39918E-01 | -2.56240E-02 | 6.33757E-03 |
| A10= | -3.22769E-01 | -4.46129E-02 | 1.48067E+00 | 1.77405E-01 | 7.91171E-03 | -8.48132E-04 |
| A12= | | | -1.64801E+00 | | | |

Fig. 16

| TABLE 7 | | | | | | |
|---|---|---|---|---|---|---|
| (Embodiment 4) | | | | | | |
| f= 3.76 mm, Fno = 2.80, HFOV= 30.7 deg. | | | | | | |
| Surface # | | Curvature Radius | Thickness | Material | Index | Abbe # | Focal length |
| 0 | Object | Plano | Infinity | | | | |
| 1 | Ape. Stop | Plano | 0.009 | | | | |
| 2 | Lens 1 | 1.52115 (ASP) | 0.834 | Plastic | 1.544 | 55.9 | 3.85 |
| 3 | | 4.48560 (ASP) | 0.383 | | | | |
| 4 | Lens 2 | 2.00071 (ASP) | 0.280 | Plastic | 1.632 | 23.4 | -36.31 |
| 5 | | 1.74053 (ASP) | 0.645 | | | | |
| 6 | Lens 3 | 3.76750 (ASP) | 1.100 | Plastic | 1.530 | 55.8 | -14.86 |
| 7 | | 2.29058 (ASP) | 0.500 | | | | |
| 8 | IR-filter | Plano | 0.300 | Glass | 1.517 | 64.2 | - |
| 9 | | Plano | 0.160 | | | | |
| 10 | Image | Plano | - | | | | |

Fig. 17

| TABLE 8 | | | | | | |
|---|---|---|---|---|---|---|
| Aspheric Coefficients | | | | | | |
| Surface # | 2 | 3 | 4 | 5 | 6 | 7 |
| k = | -4.13216E-01 | -2.73819E+01 | -2.62132E+01 | -1.78505E+01 | -2.13389E+01 | -1.22090E+01 |
| A4 = | 1.66590E-03 | -6.70584E-02 | 2.67734E-02 | 6.99561E-02 | -1.74598E-01 | -4.22465E-02 |
| A6 = | -5.93318E-02 | 1.87404E-03 | -1.89957E-02 | 1.17711E-02 | 7.00107E-02 | -6.53688E-03 |
| A8 = | 1.27049E-01 | -1.81109E-01 | -6.76043E-01 | -1.80216E-01 | -2.47486E-02 | 2.45070E-03 |
| A10= | -1.66510E-01 | 2.93409E-02 | 1.03121E+00 | 1.27406E-01 | 6.87624E-03 | -4.51239E-04 |
| A12= | | | -8.18819E-01 | | | |

Fig. 18

| TABLE 9 | | | | | | | |
|---|---|---|---|---|---|---|---|
| (Embodiment 5) | | | | | | | |
| f= 3.67 mm, Fno = 2.80, HFOV = 32.2 deg. | | | | | | | |
| Surface # | | Curvature Radius | Thickness | Material | Index | Abbe # | Focal length |
| 0 | Object | Plano | Infinity | | | | |
| 1 | Lens 1 | 1.38284 (ASP) | 0.489 | Plastic | 1.544 | 55.9 | 4.24 |
| 2 | | 3.01790 (ASP) | 0.104 | | | | |
| 3 | Ape. Stop | Plano | 0.440 | | | | |
| 4 | Lens 2 | 2.05617 (ASP) | 0.468 | Plastic | 1.632 | 23.4 | -20.48 |
| 5 | | 1.61787 (ASP) | 0.461 | | | | |
| 6 | Lens 3 | 3.69120 (ASP) | 1.500 | Plastic | 1.530 | 55.8 | 17.99 |
| 7 | | 5.17580 (ASP) | 0.500 | | | | |
| 8 | IR-filter | Plano | 0.300 | Glass | 1.517 | 64.2 | - |
| 9 | | Plano | 0.113 | | | | |
| 10 | Image | Plano | - | | | | |

Fig. 19

| TABLE 10A | | | | | |
|---|---|---|---|---|---|
| Aspheric Coefficients | | | | | |
| Surface # | 1 | 2 | 4 | 5 | 6 |
| k = | -3.63791E-01 | -4.79190E+00 | -1.99663E+01 | -6.66444E+00 | -2.67401E+00 |
| A4 = | -1.17508E-02 | -3.16811E-02 | 8.75844E-02 | 4.11808E-02 | -9.18139E-02 |
| A6 = | 3.49999E-02 | -1.29369E-02 | -1.18939E-01 | 6.36057E-02 | 4.07836E-02 |
| A8 = | -1.06870E-01 | -2.06449E-01 | -4.11574E-01 | -1.90099E-01 | -6.87226E-03 |
| A10= | 4.34474E-02 | 2.83495E-01 | 7.72320E-01 | 1.20963E-01 | 3.66539E-04 |
| A12= | -3.17703E-03 | -9.04151E-02 | -6.32882E-01 | -2.08394E-02 | |

Fig. 20A

| TABLE 10B |  |
|---|---|
| Aspheric Coefficient | |
| Surface # | 7 |
| k = | 4.58603E+00 |
| A1 = | |
| A2 = | |
| A3 = | |
| A4 = | -2.58136E-02 |
| A5 = | |
| A6 = | -4.53723E-03 |
| A7 = | |
| A8 = | -8.16048E-04 |
| A9 = | |
| A10= | 9.94035E-05 |

Fig. 20B

| TABLE 11 | | | | | |
|---|---|---|---|---|---|
| | Embodiment 1 | Embodiment 2 | Embodiment 3 | Embodiment 4 | Embodiment 5 |
| f | 3.36 | 3.37 | 3.48 | 3.76 | 3.67 |
| Fno | 2.78 | 2.45 | 2.80 | 2.80 | 2.80 |
| HFOV | 33.6 | 33.5 | 32.8 | 30.7 | 32.2 |
| V1-V2 | 32.5 | 32.5 | 32.5 | 32.5 | 32.5 |
| CT2/f | 0.09 | 0.09 | 0.08 | 0.07 | 0.13 |
| CTmax/CTmin | 3.63 | 3.71 | 4.46 | 3.93 | 3.21 |
| R1/f | 0.41 | 0.41 | 0.39 | 0.40 | 0.38 |
| R3/f | 0.58 | 0.58 | 0.60 | 0.53 | 0.56 |
| R1/R2 | 0.39 | 0.35 | 0.33 | 0.34 | 0.46 |
| R5/R6 | 0.89 | 0.92 | 1.36 | 1.64 | 0.71 |
| f/f1 | 0.88 | 0.92 | 1.01 | 0.98 | 0.87 |
| f/f2 | -0.29 | -0.32 | -0.23 | -0.10 | -0.18 |
| |f/f3| | 0.28 | 0.21 | 0.10 | 0.25 | 0.20 |
| SL/TTL | 1.01 | 0.96 | 1.00 | 1.00 | 0.86 |
| TTL/ImgH | 1.72 | 1.72 | 1.72 | 1.83 | 1.91 |

Fig. 21

PHOTOGRAPHING OPTICAL SYSTEM

CROSS-REFERENCE TO RELATED APPLICATIONS

This non-provisional application claims priority under 35 U.S.C. §119(a) on Patent Application No(s). 099107598 filed in Taiwan, R.O.C. on Mar. 16, 2010, the entire contents of which are hereby incorporated by reference.

BACKGROUND OF THE INVENTION

1. Field of the Invention

The present invention relates to a photographing optical system and more particularly, to a compact photographing optical system used in portable electronics.

2. Description of the Prior Art

In recent years, with the popularity of portable electronics, the demand for compact imaging lenses is increasing, and the sensor of a general photographing camera is none other than CCD (charge coupled device) or CMOS Sensor (Complementary Metal Oxide Semiconductor Sensor). Furthermore, advanced semiconductor manufacturing technology has allowed the pixel size of sensors to be reduced and electronic products have become more compact and powerful, there is an increasing demand for compact imaging lenses featuring better image quality.

A conventional compact photographing optical system, in order to reduce manufacturing costs, is usually composed of a two-lens structure, such as a two-lens imaging lens assembly disclosed by U.S. Pat. No. 7,525,741. However, two-lens structure has limited ability in correcting aberrations, which is unable to satisfy the demand of high level imaging modules. On the other hand, utilizing too many lens elements in the assembly will also be difficult for the total track length of the lens assembly to stay compact.

To obtain high image quality while maintaining the compact feature of the lens assembly, photographing optical system with three lens elements proves to be the solution. U.S. Pat. No. 7,564,635 discloses a photographing optical system with three lens elements. However, three lens elements of the lens assembly are all positive refractive lens elements, which make it difficult to correct the aberration (such as chromatic aberration) in the system and the image quality is compensated.

Therefore, a need exists in the art for a photographing optical system that features high image quality without having a long total track length and applicable in portable electronic products.

SUMMARY OF THE INVENTION

The present invention provides a photographing optical system comprising, in order from an object side to an image side: a first lens element with positive refractive power having a convex object-side surface; a second lens element with negative refractive power having a convex object-side surface and a concave image-side surface, at least one of the object-side and image-side surfaces thereof being aspheric; and a third lens element having the object-side and image-side surfaces thereof being aspheric, and at least one of the object-side and image-side surfaces having at least one inflection point; wherein the photographing optical system further provides a stop and an electronic sensor for image formation, the stop is disposed between the imaged object and the first lens element, and there are three lens elements with refractive power; wherein the radius of curvature on the object-side surface of the first lens element is R1, the radius of curvature on the object-side surface of the second lens element is R3, the focal length of the photographing optical system is f, the Abbe number of the first lens element is V1, the Abbe number of the second lens element is V2, the distance on the optical axis between the stop and the electronic sensor is SL, the distance on the optical axis between the object-side of the first lens element and the electronic sensor is TTL, and they satisfy the relations: $0.20 < R1/f < 1.00$; $0.30 < R3/f < 1.20$; $30.5 < V1 - V2 < 40.0$; $0.90 < SL/TTL < 1.20$.

According to another aspect of the present invention, a photographing optical system comprises, in order from the object side to the image side: a first lens element with positive refractive power having a convex object-side surface and a concave image-side surface, the object-side and image-side surfaces thereof being aspheric; a second lens element with negative refractive power having a convex object-side surface and a concave image-side surface, the object-side and image-side surfaces thereof being aspheric; and a third lens element having a convex object-side surface and a concave image-side surface, the object-side and image-side surfaces thereof being aspheric, and at least one of the object-side and image-side surfaces having at least one inflection point; wherein the photographing optical system further provides a stop and an electronic sensor for image formation, the stop is disposed between an imaged object and the second lens element, and there are three lens elements with refractive power; wherein the radius of curvature on the object-side surface of the first lens element is R1, the radius of curvature on the image-side surface of the first lens element is R2, the radius of curvature on the object-side surface of the second lens element is R3, the focal length of the photographing optical system is f, the distance on the optical axis between the stop and the electronic sensor is SL, the distance on the optical axis between the object-side of the first lens element and the electronic sensor is TTL, and they satisfy the relations: $0.10 < R1/R2 < 0.50$; $0.30 < R3/f < 4.50$; $0.70 < SL/TTL < 1.20$.

According to another aspect of the present invention, a photographing optical system comprises, in order from the object side to the image side: a first lens element with positive refractive power having a convex object-side surface; a second lens element with negative refractive power having a convex object-side surface and a concave image-side surface, at least one of the object-side and image-side surfaces thereof being aspheric; and a third lens element with negative refractive power having at least one of the object-side and image-side surfaces thereof being aspheric; wherein there are three lens elements with refractive power in the photographing optical system.

The aforementioned arrangement of optical elements can effectively reduce the total track length of the lens assembly, attenuate the sensitivity of the optical system, and obtain higher resolution.

In the present photographing optical system, the first lens element with positive refractive power provides the main refractive power of the system, which reduces the total track length of the photographing optical system; the second lens element has negative refractive power so as to favorably correct the aberration generated from the first lens element and the chromatic aberration of the system; the third lens element can have positive or negative refractive power, which acts as a correction lens element for balancing and correcting numerous types of aberration within the optical system; when the third lens element has positive refractive power, the refractive power of the first lens element can be effectively distributed to reduce the sensitivity of the system; when the third lens element has negative refractive power, the principal point of the optical system can be further away from the image plane to reduce the total track length of the system in order to stay compact.

In the present photographing optical system, the first lens element may be a bi-convex lens element or a meniscus lens element having a convex object-side surface and a concave image-side surface. When the first lens element is a bi-convex lens element, the refractive power thereof can be effectively enhanced, thus shortening the total track length of the photographing optical system. When the first lens element is a meniscus lens element, the astigmatism of the system can be corrected more favorably and the image quality can be improved. The second lens element may have a convex object-side surface and a concave image-side surface so that the aberration generated in the first lens element can be favorably corrected and the refractive power of the second lens element can be favorably maintained in order to reduce the sensitivity of the system. The third lens element can be a meniscus lens element having a convex object-side surface and a concave image-side surface or a bi-concave lens element. When the third lens element is a convex-concave meniscus lens element, astigmatism of the system and high order aberration can be favorably corrected. When the third lens element is bi-concave, the principal point of the optical system is further away from the image plane, in order to effectively reduce the total track length of the system and keep the system compact.

In the present photographing optical system, the stop can be disposed between an imaged object and the first lens element or between the first and second lens elements. When the first lens element provides positive refractive power and the stop is disposed near the object side of the photographing optical system, the total track length of the photographing optical system can be reduced effectively. The aforementioned arrangement also enables the exit pupil of the photographing optical system to be positioned far away from the image plane, thus light will be projected onto the electronic sensor at a nearly perpendicular angle, and this is the telecentric feature of the image side. The telecentric feature is very important to the photosensitive power of the solid-state sensor as it can improve the photosensitivity of the sensor to reduce the probability of shading occurrence. Moreover, the third lens element is provided with at least one inflection point, thereby the angle of incidence from the off-axis field can be effectively reduced to further correct the off-axis aberrations. In addition, when the stop is positioned closer to the second lens element, the feature of the wide angle of view is emphasized which corrects the distortion and chromatic aberration of magnification, and such arrangement effectively reduces the sensitivity of the system. Thus, in the present photographing optical system, when the stop is disposed closer to the imaged object, the telecentric feature is emphasized and this enables a shorter total track length. When the stop is disposed closer to the second lens element, the wide angle of view is emphasized and the sensitivity of the photographing optical system can be effectively reduced.

BRIEF DESCRIPTION OF THE DRAWINGS

FIG. 11 is TABLE 1 which lists the optical data of the first embodiment.

FIG. 12 is TABLE 2 which lists the aspheric surface data of the first embodiment.

FIG. 13 is TABLE 3 which lists the optical data of the second embodiment.

FIG. 14 is TABLE 4 which lists the aspheric surface data of the second embodiment.

FIG. 15 is TABLE 5 which lists the optical data of the third embodiment.

FIG. 16 is TABLE 6 which lists the aspheric surface data of the third embodiment.

FIG. 17 is TABLE 7 which lists the optical data of the fourth embodiment.

FIG. 18 is TABLE 8 which lists the aspheric surface data of the fourth embodiment.

FIG. 19 is TABLE 9 which lists the optical data of the fifth embodiment.

FIG. 20 is TABLES 10 which lists the aspheric surface data of the fifth embodiment.

FIG. 21 is TABLE 11 which lists the data of the respective embodiments resulting from the equations.

DETAILED DESCRIPTION OF THE PREFERRED EMBODIMENTS

Figure 1:
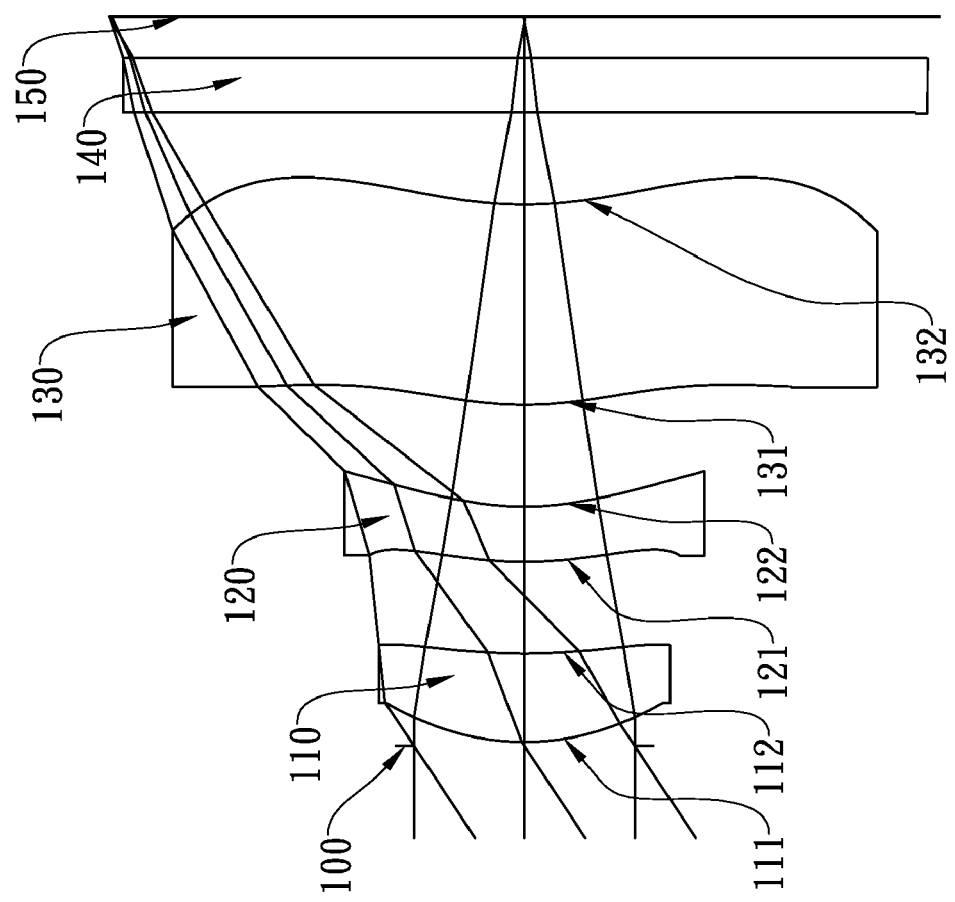
FIG. 1 shows a photographing optical system in accordance with a first embodiment of the present invention.

The present invention provides a photographing optical system comprising, in order from an object side to an image side: a first lens element with positive refractive power having a convex object-side surface; a second lens element with negative refractive power having a convex object-side surface and a concave image-side surface, at least one of the object-side and image-side surfaces thereof being aspheric; and a third lens element having the object-side and image-side surfaces thereof being aspheric, and at least one of the object-side and image-side surfaces having at least one inflection point; wherein the photographing optical system further provides a stop and an electronic sensor for image formation, the stop is disposed between an imaged object and the first lens element, there are three lens elements with refractive power; and wherein the radius of curvature on the object-side surface of the first lens element is R1, the radius of curvature on the object-side surface of the second lens element is R3, the focal length of the photographing optical system is f, the Abbe number of the first lens element is V1, the Abbe number of the second lens element is V2, the distance on the optical axis between the stop and the electronic sensor is SL, the distance on the optical axis between the object-side surface of the first lens element and the electronic sensor is TTL, and they satisfy the relations: $0.20<R1/f<1.00$; $0.30<R3/f<1.20$; $30.5<V1-V2<40.0$; $0.90<SL/TTL<1.20$.

When the aforementioned photographing optical system satisfies the relation of $0.20<R1/f<1.00$, the total track length of the photographing optical system can be reduced while preventing the high order aberration from becoming too large; preferably, they satisfy the relation: $0.30<R1/f<0.45$. When the aforementioned photographing optical system satisfies the relation of $0.30<R3/f<1.20$, the negative refractive power of the second lens element is more appropriate while correcting the aberration of the photographing optical system; preferably, they satisfy the relation: $0.40<R3/f<0.70$. When the aforementioned photographing optical system satisfies the relation: $30.5<V1-V2<40.0$, the chromatic aberration can be effectively corrected. When the aforementioned photographing optical system satisfies the relation: $0.90<SL/TTL<1.20$, the photographing optical system can have a favorable balance between the telecentric feature and the wide angle of view.

In the aforementioned photographing optical system of the present invention, preferably, the first lens element has a concave image-side surface, wherein the first lens is a convex-concave meniscus lens element, which effectively corrects the astigmatism of the system and improves the system image quality; preferably, the third lens element has a concave image-side surface, which can position the principal point of the optical system away from the image plane and reduce the total track length of the optical system in order to stay compact.

In the aforementioned photographing optical system of the present invention, preferably, the third lens element is made of plastic materials. Plastic material is favorable for manufacturing of aspherical lenses and reducing production costs.

In the aforementioned photographing optical system of the present invention, the focal length of the photographing optical system is f, the focal length of the first lens element is f1, and preferably, they satisfy the relation: $0.75<f/f1<1.20$. When f/f1 satisfies the relation, the refractive power of the first lens element is more balanced, can effectively control the total track length of the system, maintain its compact feature, and prevent high order spherical aberration from becoming too large, in order to improve the image quality; preferably, they satisfy the relation: $0.85<f/f1<1.05$.

In the aforementioned photographing optical system of the present invention, the focal length of the photographing optical system is f, the focal length of the second lens element is f2, and preferably, they satisfy the relation: $-0.45<f/f2<-0.15$. When f/f2 satisfies the relation, the chromatic aberration of the system can be effectively corrected while preventing the refractive power of the second lens element from becoming too large, in order to reduce the sensitivity of the photographing optical system.

In the aforementioned photographing optical system of the present invention, the thickness on the optical axis of the second lens element is CT2, the focal length of the photographing optical system is f, and preferably, they satisfy the relation: $0.04<CT2/f<0.12$. When CT2/f satisfies the relation, the thickness of the second lens element is more appropriate for a good balance in consideration between the yield of lens manufacturing and correcting aberration of the system.

In the aforementioned photographing optical system of the present invention, the focal length of the photographing optical system is f, the focal length of the third lens element is f3, and preferably, they satisfy the relation: $0.06<|f/f3|<0.35$. When |f/f3| satisfies the relation, the third lens element serves as a corrective lens element for balancing and correcting all types of aberrations of the system, which can correct astigmatism and distortion of the system and improve the resolution of the photographing optical system.

In the aforementioned photographing optical system of the present invention, the radius of curvature on the object-side surface of the third lens element is R5, the radius of curvature on the image-side surface of the third lens element is R6, and preferably, they satisfy the relation: $0.70<R5/R6<2.00$. When R5/R6 satisfies the relation, high order aberration of the system can be favorably corrected for better image quality.

In the aforementioned photographing optical system of the present invention, the distance on the optical axis between the object-side surface of the first lens element and the electronic sensor is TTL, half of the diagonal length of the effective pixel area on the electronic sensor is ImgH, and preferably, they satisfy the relation: $TTL/ImgH<1.9$. When TTL/ImgH satisfies the relation, the photographing optical system can stay compact for applications in light weight mobile electronics.

According to another aspect of the present invention, a photographing optical system comprises, in order from an object side to an image side: a first lens element with positive refractive power having a convex object-side surface and a concave image-side surface, the object-side and image-side surfaces thereof being aspheric; a second lens element with negative refractive power having a convex object-side surface and a concave image-side surface, the object-side and image-side surfaces thereof being aspheric; and a third lens element having a convex object-side surface and a concave image-side surface, the object-side and image-side surfaces thereof being aspheric, and at least one of the object-side and image-side surfaces having at least one inflection point; wherein the photographing optical system further provides a stop and an electronic sensor for image formation; wherein the stop is disposed between an imaged object and the second lens element, and there are three lens elements with refractive power; and wherein the radius of curvature on the object-side surface of the first lens element is R1, the radius of curvature on the image-side surface of the first lens element is R2, the radius of curvature on the object-side surface of the second lens element is R3, the focal length of the photographing optical system is f, the distance on the optical axis between the stop and the electronic sensor is SL, the distance on the optical axis between the object-side surface of the first lens element and the electronic sensor is TTL, and they satisfy the relations: $0.10<R1/R2<0.50$; $0.30<R3/f<4.50$; $0.70<SL/TTL<1.20$.

When the aforementioned photographing optical system satisfies the relation of $0.10<R1/R2<0.50$, spherical aberration of the system can be corrected. When the aforementioned photographing optical system satisfies the relation of $0.30<R3/f<4.50$, the negative refractive power of the second lens element can be effectively adjusted for correcting the aberration of the photographing optical system; preferably, they satisfy the relation: $0.30<R3/f<1.20$; furthermore, they preferably satisfy the relation: $0.40<R3/f<0.70$. When the aforementioned photographing optical system satisfies the relation of $0.70<SL/TTL<1.20$, the photographing optical system can obtain a favorable balance between the telecentric feature and the wide angle of view; preferably, the stop is disposed between an imaged object and the first lens element and it satisfies the relation: $0.90<SL/TTL<1.20$.

In the aforementioned photographing optical system of the present invention, preferably, the first lens element is made of plastic materials. Plastic material is favorable for manufacturing of aspherical lenses and reducing production costs.

In the aforementioned photographing optical system of the present invention, the Abbe number of the first lens element is V1, the Abbe number of the second lens element is V2, and preferably, they satisfy the relation: $30.5<V1-V2<40.0$. When V1-V2 satisfies the relation, the chromatic aberration of the photographing optical system can be favorably corrected.

In the aforementioned photographing optical system of the present invention, the focal length of the photographing optical system is f, the focal length of the first lens element is f1, and preferably, they satisfy the relation; 0.75<f/f1<1.20. When f/f1 satisfies the relation, the arrangement of the refractive power for the first lens element is more balanced, while effectively controlling the total track length of the system to stay compact and preventing the high order spherical aberration from becoming too large, in order to improve image quality of the system.

In the aforementioned photographing optical system of the present invention, the thickness on the optical axis of the second lens element is CT2, the focal length of the photographing optical system is f, and preferably, they satisfy the relation: 0.04<CT2/f<0.12. When CT2/f satisfies the relation, the thickness of the second lens element is more appropriate and a favorable balance in consideration between the yield of lens manufacturing and correcting the aberration of the system.

In the aforementioned photographing optical system of the present invention, the radius of curvature on the object-side surface of the first lens element is R1, the focal length of the photographing optical system is f, and preferably, they satisfy the relation: 0.30<R1/f<0.45. When R1/f satisfies the relation, the total track length of the photographing optical system can be reduced effectively and high order aberration can be prevented from becoming too large.

In the aforementioned photographing optical system of the present invention, the focal length of the photographing optical system is f, the focal length of the third lens element is f3, and preferably, they satisfy the relation: 0.06<|f/f3|<0.35. When |f/f3| satisfies the relation, the third lens element serves as a correction lens element for balancing and correcting all types of aberrations in the system, which can favorably correct the astigmatism and distortion of the system and improve the resolution of the photographing optical system.

According to another aspect of the present invention, a photographing optical system comprises, in order from an object side to an image side: a first lens element with positive refractive power having a convex object-side surface; a second lens element with negative refractive power having a convex object-side surface and a concave image-side surface, at least one of the object-side and image-side surfaces thereof being aspheric; and a third lens element with negative refractive power having at least one of the object-side and image-side surfaces thereof being aspheric; wherein there are three lens elements with refractive power.

In the aforementioned photographing optical system of the present invention, preferably, the third lens element has at least one inflection point formed on the object-side and image-side surfaces, which effectively reduces the incident angle of off-axis light projecting onto the sensor and further corrects the aberration of off-axis field of view.

In the aforementioned photographing optical system of the present invention, the maximum thickness on the optical axis of individual lenses of the photographing optical system is CTmax, the minimum thickness on the optical axis of individual lenses of the photographing optical system is CTmin, and preferably, they satisfy the relation: 3.0<CTmax/CTmin<4.8. When CTmax/CTmin satisfies the relation, the thickness of the lens elements in the photographing optical system is more appropriate, which provides favorable moldability and homogeneity of plastic injection molding for lens elements in the system and superior image quality for the photographing optical system.

In the aforementioned photographing optical system of the present invention, the focal length of the photographing optical system is f, the focal length of the first lens element is f1, and preferably, they satisfy the relation: 0.85<f/f1<1.05. When f/f1 satisfies the relation, the arrangement of refractive power for the first lens element is more balanced, while effectively controlling the total track length of the system to stay compact and preventing the high order spherical aberration from becoming too large, in order to improve image quality of the system.

In the aforementioned photographing optical system of the present invention, a stop and an electronic sensor for image formation are further provided, the stop is disposed between an imaged object and the first lens element, the distance on the optical axis between the stop and the electronic sensor is SL, the distance on the optical axis between the object-side surface of the first lens element and the electronic sensor is TTL, and preferably, they satisfy the relation: 0.90<SL/TTL<1.20. When SL/TTL satisfies the relation, the photographing optical system can obtain a favorable balance between the telecentric feature and the wide angle of view.

In the aforementioned photographing optical system of the present invention, the radius of curvature on the object-side surface of the second lens element is R3, the focal length of the photographing optical system is f, and preferably, they satisfy the relation: 0.30<R3/f<1.20. When R3/f satisfies the relation, the negative refractive power of the second lens element can be effectively adjusted for correcting the aberration of the photographing optical system.

In the aforementioned photographing optical system of the present invention, the radius of curvature on the object-side surface of the first lens element is R1, the focal length of the photographing optical system is f, and preferably, they satisfy the relation: 0.30<R1/f<0.45. When R1/f satisfies the relation, the total track length of the photographing optical system can be reduced effectively and high order aberration can be prevented from becoming too large.

In the aforementioned photographing optical system of the present invention, the thickness on the optical axis of the second lens element is CT2, the focal length of the photographing optical system is f, and preferably, they satisfy the relation: 0.04<CT2/f<0.12. When CT2/f satisfies the relation, the thickness of the second lens element is more appropriate and a favorable balance in consideration between the yield of lens manufacturing and correcting the aberration of the system.

In the present photographing optical system, the lens elements can be made of glass or plastic materials. If the lens elements are made of glass, there is more freedom in distributing the refractive power of the system. If plastic materials are adopted to produce the lens elements, the production cost will be reduced effectively. Additionally, the surfaces of the lens elements can be aspheric and easily made into non-spherical profiles, allowing more design parameter freedom which can be used to reduce aberrations and the total number of the lens elements, so that the total track length of the photographing optical system can be effectively reduced.

In the present photographing optical system, if a lens element has a convex surface, it means the portion of the surface in proximity of the axis is convex; if a lens element has a concave surface, it means the portion of the surface in proximity of the axis is concave.

Preferred embodiments of the present invention will be described in the following paragraphs by referring to the accompanying drawings.

Figure 2:
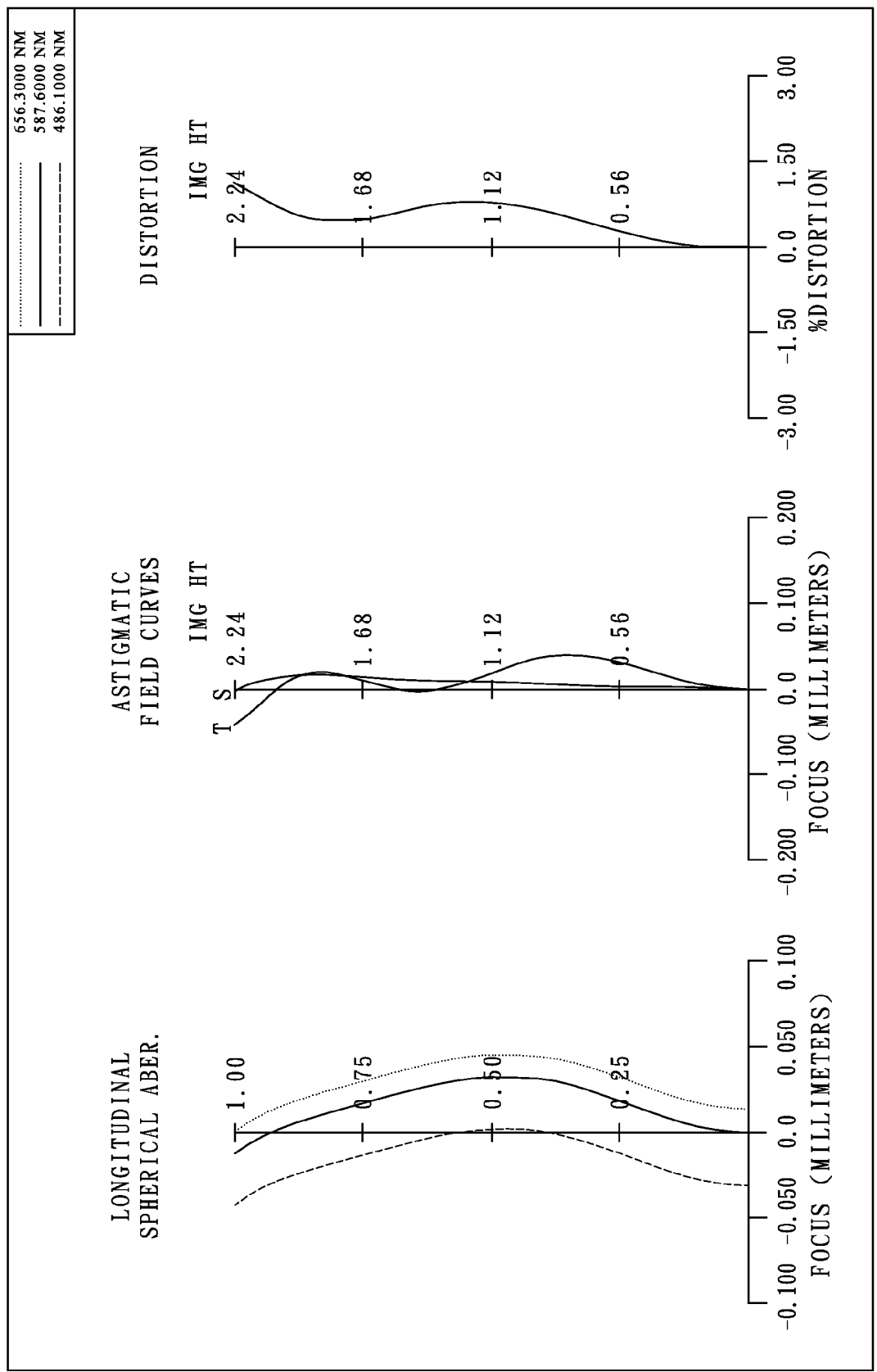
FIG. 2 shows the aberration curves of the first embodiment of the present invention.

FIG. 1 shows a photographing optical system in accordance with a first embodiment of the present invention, and FIG. 2 shows the aberration curves of the first embodiment of the present invention. The photographing optical system of the first embodiment of the present invention mainly comprises three lens elements, in order from an object side to an image side: a plastic first lens element 110 with positive refractive power having a convex object-side surface 111 and a concave image-side surface 112, the object-side and image-side surfaces 111 and 112 thereof being aspheric; a plastic second lens element 120 with negative refractive power having a convex object-side surface 121 and a concave image-side surface 122, the object-side and image-side surfaces 121 and 122 thereof being aspheric; a plastic third lens element 130 with positive refractive power having a convex object-side surface 131 and a concave image-side surface 132, the object-side and image-side surfaces 131 and 132 thereof being aspheric, and at least one of the object-side surface 131 and the image-side surface 132 having at least one inflection point; wherein the photographing optical system further provides a stop 100 disposed between an imaged object and the first lens element 110; wherein an IR filter 140 is disposed between the image-side surface 132 of the third lens element 130 and an image plane 150;

and wherein the IR filter 140 is made of glass and has no influence on the focal length of the photographing optical system.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present photographing optical system, the focal length of the photographing optical system is f, and it satisfies the relation: f=3.36 (mm).

In the first embodiment of the present photographing optical system, the f-number of the photographing optical system is Fno, and it satisfies the relation: Fno=2.78.

In the first embodiment of the present photographing optical system, half of the maximal field of view of the photographing optical system is HFOV, and it satisfies the relation: HFOV=33.6 deg.

In the first embodiment of the present photographing optical system, the Abbe number of the first lens element 110 is V1, the Abbe number of the second lens element 120 is V2, and they satisfy the relation: V19−V2=32.5.

In the first embodiment of the present photographing optical system, the thickness on the optical axis of the second lens element 120 is CT2, the focal length of the photographing optical system is f, and they satisfy the relation: CT2/f=0.09.

In the first embodiment of the present photographing optical system, the maximum thickness on the optical axis of individual lenses of the photographing optical system is CTmax, the minimum thickness on the optical axis of individual lenses of the photographing optical system is CTmin, and they satisfy the relation: CTmax/CTmin=3.63.

In the first embodiment of the present photographing optical system, the radius of curvature of the object-side surface 111 of the first lens element 110 is R1, the focal length of the photographing optical system is f, and they satisfy the relation: R1/f=0.41.

In the first embodiment of the present photographing optical system, the radius of curvature of the object-side surface 121 of the second lens element 120 is R3, the focal length of the photographing optical system is f, and they satisfy the relation: R3/f=0.58.

In the first embodiment of the present photographing optical system, the radius of curvature of the object-side surface 111 of the first lens element 110 is R1, the radius of curvature of the image-side surface 112 of the first lens element 110 is R2, and they satisfy the relation: R1/R2=0.39.

In the first embodiment of the present photographing optical system, the radius of curvature of the object-side surface 131 of the third lens element 130 is R5, the radius of curvature of the image-side surface 132 of the third lens element 130 is R6, and they satisfy the relation: R5/R6=0.89.

In the first embodiment of the present photographing optical system, the focal length of the photographing optical system is f, the focal length of the first lens element 110 is f1, and they satisfy the relation: f/f1=0.88.

In the first embodiment of the present photographing optical system, the focal length of the photographing optical system is f, the focal length of the second lens element 120 is f2, and they satisfy the relation: f/f2=−0.29.

In the first embodiment of the present photographing optical system, the focal length of the photographing optical system is f, the focal length of the third lens element 130 is f3, and they satisfy the relation: |f/f3|=0.28.

In the first embodiment of the present photographing optical system, the photographing optical further provides an electronic sensor for image formation at the image plane 150, the distance on the optical axis between the stop 100 and the electronic sensor is SL, the distance on the optical axis between the object-side surface 111 of the first lens element 110 and the electronic sensor is TTL, and they satisfy the relation: SL/TTL=1.01.

In the first embodiment of the present photographing optical system, the distance on the optical axis between the object-side surface 111 of the first lens element 110 and the electronic sensor is TTL, half of the diagonal length of the effective pixel area of the electronic sensor is ImgH, and they satisfy the relation: TTL/ImgH=1.72.

The detailed optical data of the first embodiment is shown in FIG. 11 (TABLE 1), and the aspheric surface data is shown in FIG. 12 (TABLE 2), wherein the units of the radius of curvature, the thickness and the focal length are expressed in mm, and HFOV is half of the maximal field of view.

Figure 3:
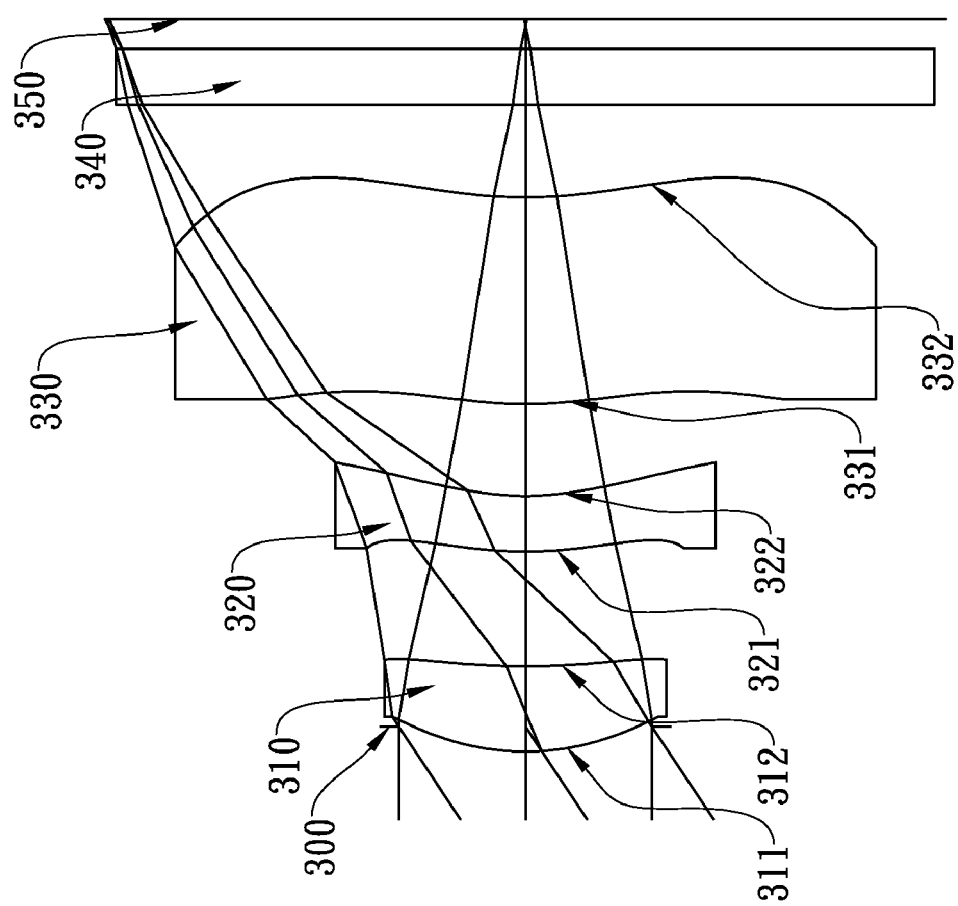
FIG. 3 shows a photographing optical system in accordance with a second embodiment of the present invention.
Figure 4:
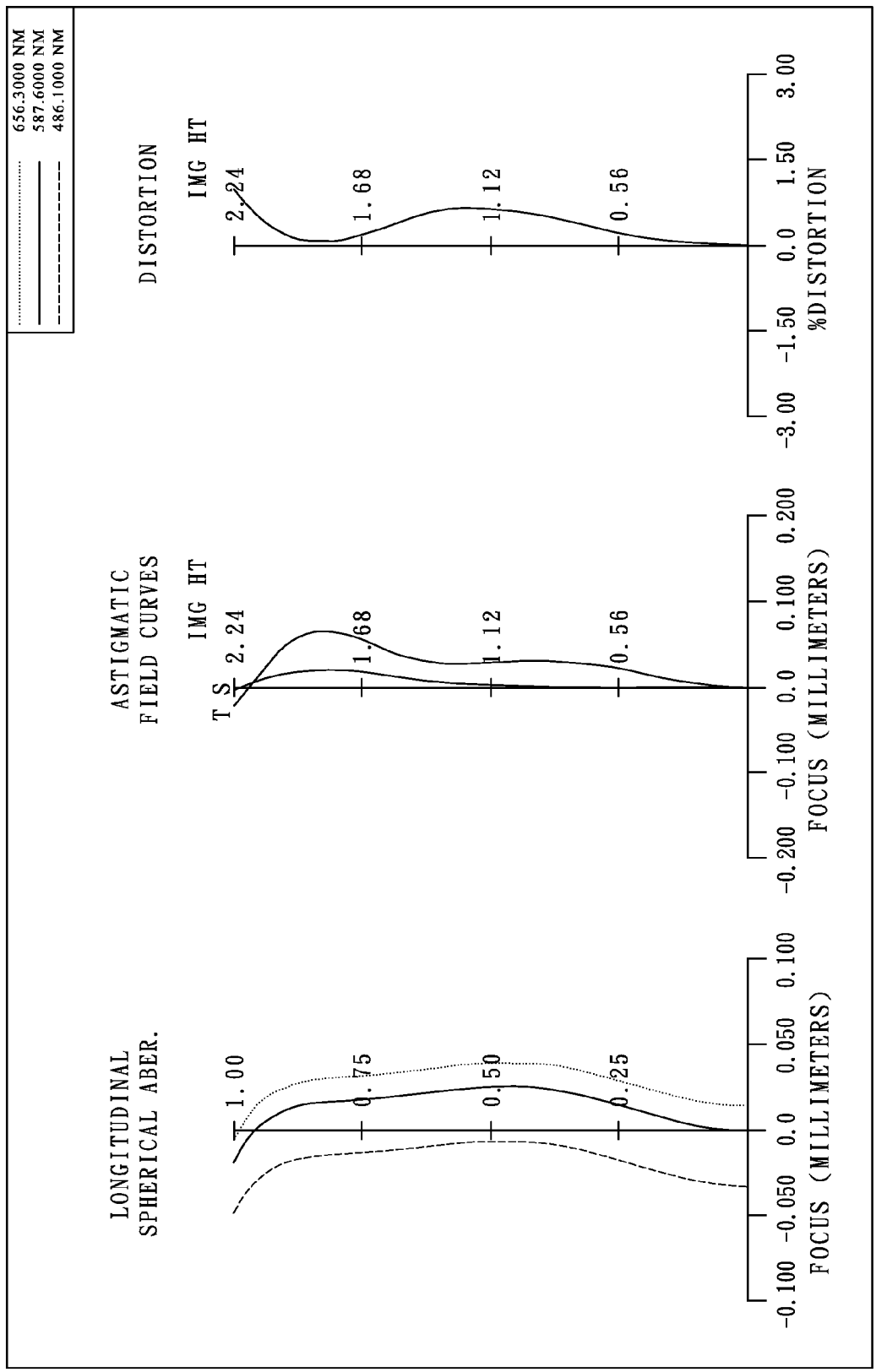
FIG. 4 shows the aberration curves of the second embodiment of the present invention.

FIG. 3 shows a photographing optical system in accordance with a second embodiment of the present invention, and FIG. 4 shows the aberration curves of the second embodiment of the present invention. The photographing optical system of the second embodiment of the present invention mainly comprises three lens elements, in order from the object side to the image side: a plastic first lens element 310 with positive refractive power having a convex object-side surface 311 and a concave image-side surface 312, the object-side and image-side surfaces 311 and 312 thereof being aspheric; a plastic second lens element 320 with negative refractive power having a convex object-side surface 321 and a concave image-side surface 322, the object-side and image-side surfaces 321 and 322 thereof being aspheric; a plastic third lens element 330 with positive refractive power having a convex object-side surface 331 and a concave image-side surface 332, the object-side and image-side surfaces 331 and 332 thereof being aspheric, at least one inflection point formed on the object-side surface 331 and image-side surface 332; wherein the photographing optical system provides a stop 300 disposed between an imaged object and the first lens element 310; wherein the photographing optical system further provides an IR filter 340 disposed between the image-side surface 332 of the third lens element 330 and an image plane 350; and wherein the IR filter 340 is made of glass and have no influence on the focal length of the photographing optical system.

The equation of the aspheric surface profiles of the second embodiment has the same form as that of the first embodiment.

In the second embodiment of the present photographing optical system, the focal length of the photographing optical system is f, and it satisfies the relation: f=3.37 (mm).

In the second embodiment of the present photographing optical system, the f-number of the photographing optical system is Fno, and it satisfies the relation: Fno=2.45.

In the second embodiment of the present photographing optical system, half of the maximal field of view of the photographing optical system is HFOV, and it satisfies the relation: HFOV=33.5 deg.

In the second embodiment of the present photographing optical system, the Abbe number of the first lens element 310 is V1, the Abbe number of the second lens element 320 is V2, and they satisfy the relation: V1−V2=32.5.

In the second embodiment of the present photographing optical system, the thickness on the optical axis of the second lens element 320 is CT2, the focal length of the photographing optical system is f, and they satisfy the relation: CT2/f=0.09.

In the second embodiment of the present photographing optical system, the maximum thickness on the optical axis of individual lenses of the photographing optical system is CTmax, the minimum thickness on the optical axis of individual lenses of the photographing optical system is CTmin, and they satisfy the relation: CTmax/CTmin=3.71.

In the second embodiment of the present photographing optical system, the radius of curvature of the object-side surface 311 of the first lens element 310 is R1, the focal length of the photographing optical system is f, and they satisfy the relation: R1/f=0.41.

In the second embodiment of the present photographing optical system, the radius of curvature of the object-side surface 321 of the second lens element 320 is R3, the focal length of the photographing optical system is f, and they satisfy the relation: R3/f=0.58.

In the second embodiment of the present photographing optical system, the radius of curvature of the object-side surface 311 of the first lens element 310 is R1, the radius of curvature of the image-side surface 312 of the first lens element 310 is R2, and they satisfy the relation: R1/R2=0.35.

In the second embodiment of the present photographing optical system, the radius of curvature of the object-side surface 331 of the third lens element 330 is R5, the radius of curvature of the image-side surface 332 of the third lens element 330 is R6, and they satisfy the relation: R5/R6=0.92.

In the second embodiment of the present photographing optical system, the focal length of the photographing optical system is f, the focal length of the first lens element 310 is f1, and they satisfy the relation: f/f1=0.92.

In the second embodiment of the present photographing optical system, the focal length of the photographing optical system is f, the focal length of the second lens element 320 is f2, and they satisfy the relation: f/f2=−0.32.

In the second embodiment of the present photographing optical system, the focal length of the photographing optical system is f, the focal length of the third lens element 330 is f3, and they satisfy the relation: |f/f3|=0.21.

In the second embodiment of the present photographing optical system, the photographing optical further provides an electronic sensor for image formation at the image plane 350, the distance on the optical axis between the stop 300 and the electronic sensor is SL, the distance on the optical axis between the object-side surface 311 of the first lens element 310 and the electronic sensor is TTL, and they satisfy the relation: SL/TTL=0.96.

In the second embodiment of the present photographing optical system, the distance on the optical axis between the object-side surface 311 of the first lens element 310 and the electronic sensor is TTL, half of the diagonal length of the effective pixel area of the electronic sensor is ImgH, and they satisfy the relation: TTL/ImgH=1.72.

The detailed optical data of the second embodiment is shown in FIG. 13 (TABLE 3), and the aspheric surface data is shown in FIG. 14 (TABLE 4), wherein the units of the radius of curvature, the thickness and the focal length are expressed in mm, and HFOV is half of the maximal field of view.

Figure 5:
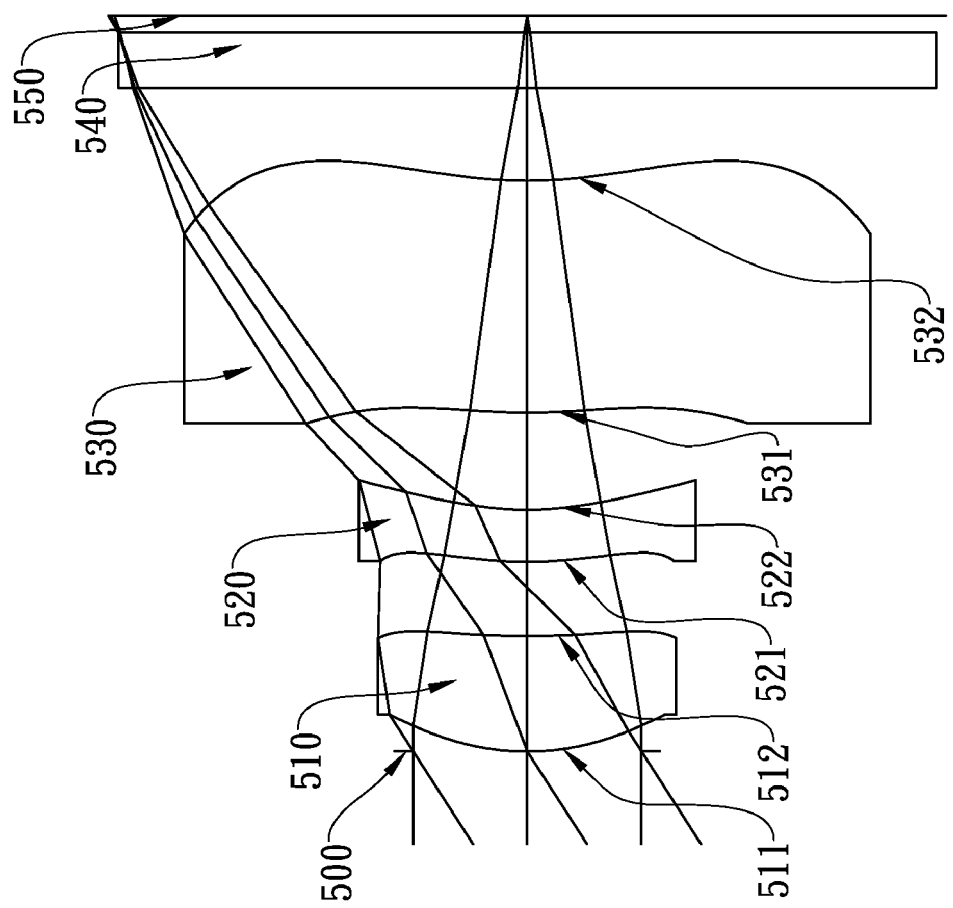
FIG. 5 shows a photographing optical system in accordance with a third embodiment of the present invention.
Figure 6:
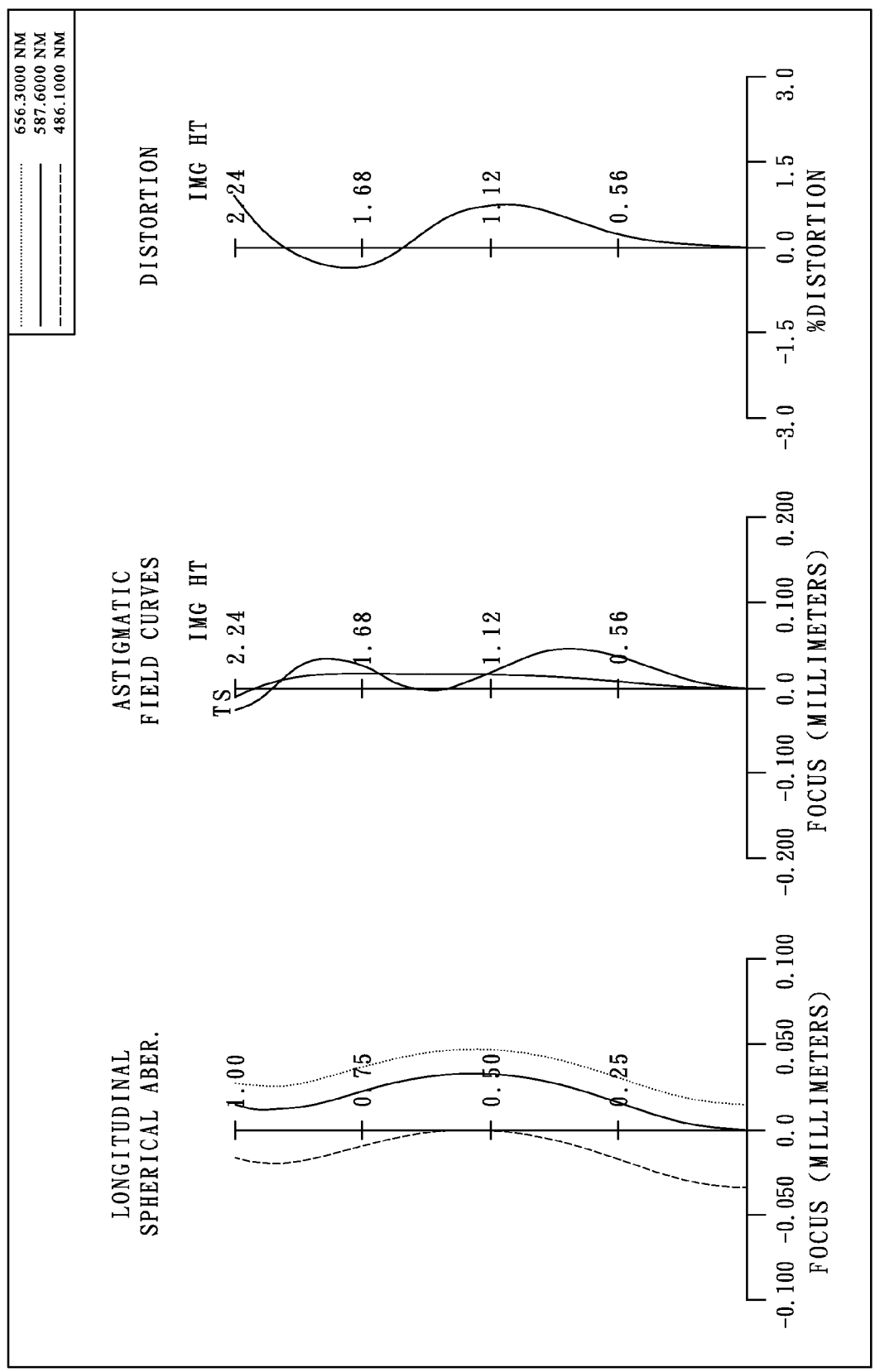
FIG. 6 shows the aberration curves of the third embodiment of the present invention.

FIG. 5 shows a photographing optical system in accordance with a third embodiment of the present invention, and FIG. 6 shows the aberration curves of the third embodiment of the present invention. The photographing optical system of the third embodiment of the present invention mainly comprises three lens elements, in order from the object side to the image side: a plastic first lens element 510 with positive refractive power having a convex object-side surface 511 and a concave image-side surface 512, the object-side and image-side surfaces 511 and 512 thereof being aspheric; a plastic second lens element 520 with negative refractive power having a convex object-side surface 521 and a concave image-side surface 522, the object-side and image-side surfaces 521 and 522 thereof being aspheric; a plastic third lens element 530 with negative refractive power having a convex object-side surface 531 and a concave image-side surface 532, the object-side and image-side surfaces 531 and 532 thereof being aspheric, at least one inflection formed on the object-side surface 531 and image-side surface 532; wherein the photographing optical system provides a stop 500 disposed between an imaged object and the first lens element 510; wherein the photographing optical system further provides an IR filter 540 disposed between the image-side surface 532 of the third lens element 530 and an image plane 550; wherein the IR filter 540 is made of glass and has no influence on the focal length of the photographing optical system.

The equation of the aspheric surface profiles of the third embodiment has the same form as that of the first embodiment.

In the third embodiment of the present photographing optical system, the focal length of the photographing optical system is f, and it satisfies the relation: f=3.48 (mm).

In the third embodiment of the present photographing optical system, the f-number of the photographing optical system is Fno, and it satisfies the relation: Fno=2.80.

In the third embodiment of the present photographing optical system, half of the maximal field of view of the photographing optical system is HFOV, and it satisfies the relation: HFOV=32.8 deg.

In the third embodiment of the present photographing optical system, the Abbe number of the first lens element 510 is V1, the Abbe number of the second lens element 520 is V2, and they satisfy the relation: V1−V2=32.5.

In the third embodiment of the present photographing optical system, the thickness on the optical axis of the second lens element 520 is CT2, the focal length of the photographing optical system is f, and they satisfy the relation: CT2/f=0.08.

In the third embodiment of the present photographing optical system, the maximum thickness on the optical axis of individual lenses of the photographing optical system is CTmax, the minimum thickness on the optical axis of individual lenses of the photographing optical system is CTmin, and they satisfy the relation: CTmax/CTmin=4.46.

In the third embodiment of the present photographing optical system, the radius of curvature of the object-side surface 511 of the first lens element 510 is R1, the focal length of the photographing optical system is f, and they satisfy the relation: R1/f=0.39.

In the third embodiment of the present photographing optical system, the radius of curvature of the object-side surface 521 of the second lens element 520 is R3, the focal length of the photographing optical system is f, and they satisfy the relation: R3/f=0.60.

In the third embodiment of the present photographing optical system, the radius of curvature of the object-side surface 511 of the first lens element 510 is R1, the radius of curvature of the image-side surface 512 of the first lens element 510 is R2, and they satisfy the relation: R1/R2=0.33.

In the third embodiment of the present photographing optical system, the radius of curvature of the object-side surface 531 of the third lens element 530 is R5, the radius of curvature of the image-side surface 532 of the third lens element 530 is R6, and they satisfy the relation: R5/R6=1.36.

In the third embodiment of the present photographing optical system, the focal length of the photographing optical system is f, the focal length of the first lens element 510 is f1, and they satisfy the relation: f/f1=1.01.

In the third embodiment of the present photographing optical system, the focal length of the photographing optical system is f, the focal length of the second lens element 520 is f2, and they satisfy the relation: f/f2=−0.23.

In the third embodiment of the present photographing optical system, the focal length of the photographing optical system is f, the focal length of the third lens element 530 is f3, and they satisfy the relation: |f/f3|=0.10.

In the third embodiment of the present photographing optical system, the photographing optical further provides an electronic sensor for image formation at the image plane 550, the distance on the optical axis between the stop 500 and the electronic sensor is SL, the distance on the optical axis between the object-side surface 511 of the first lens element 510 and the electronic sensor is TTL, and they satisfy the relation: SL/TTL=1.00.

In the third embodiment of the present photographing optical system, the distance on the optical axis between the object-side surface 511 of the first lens element 510 and the electronic sensor is TTL, half of the diagonal length of the effective pixel area of the electronic sensor is ImgH, and they satisfy the relation: TTL/ImgH=1.72.

The detailed optical data of the third embodiment is shown in FIG. 15 (TABLE 5), and the aspheric surface data is shown in FIG. 16 (TABLE 6), wherein the units of the radius of curvature, the thickness and the focal length are expressed in mm, and HFOV is half of the maximal field of view.

Figure 7:
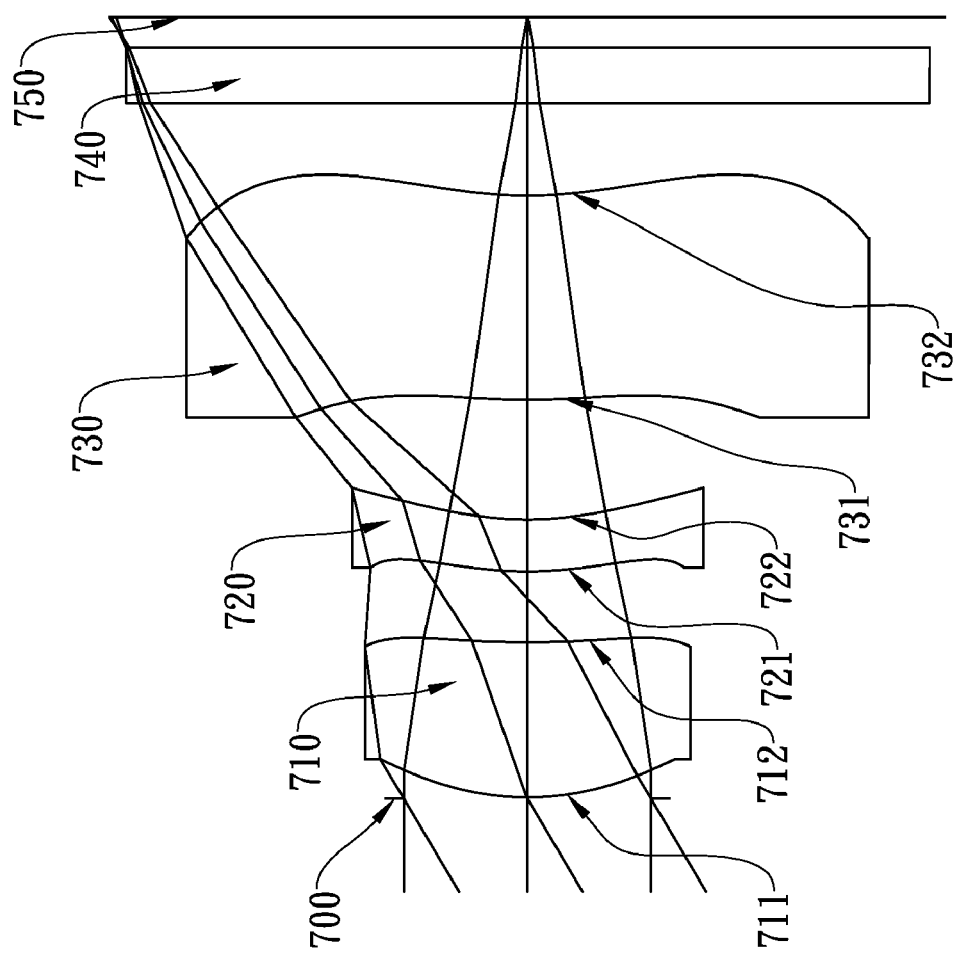
FIG. 7 shows a photographing optical system in accordance with a fourth embodiment of the present invention.
Figure 8:
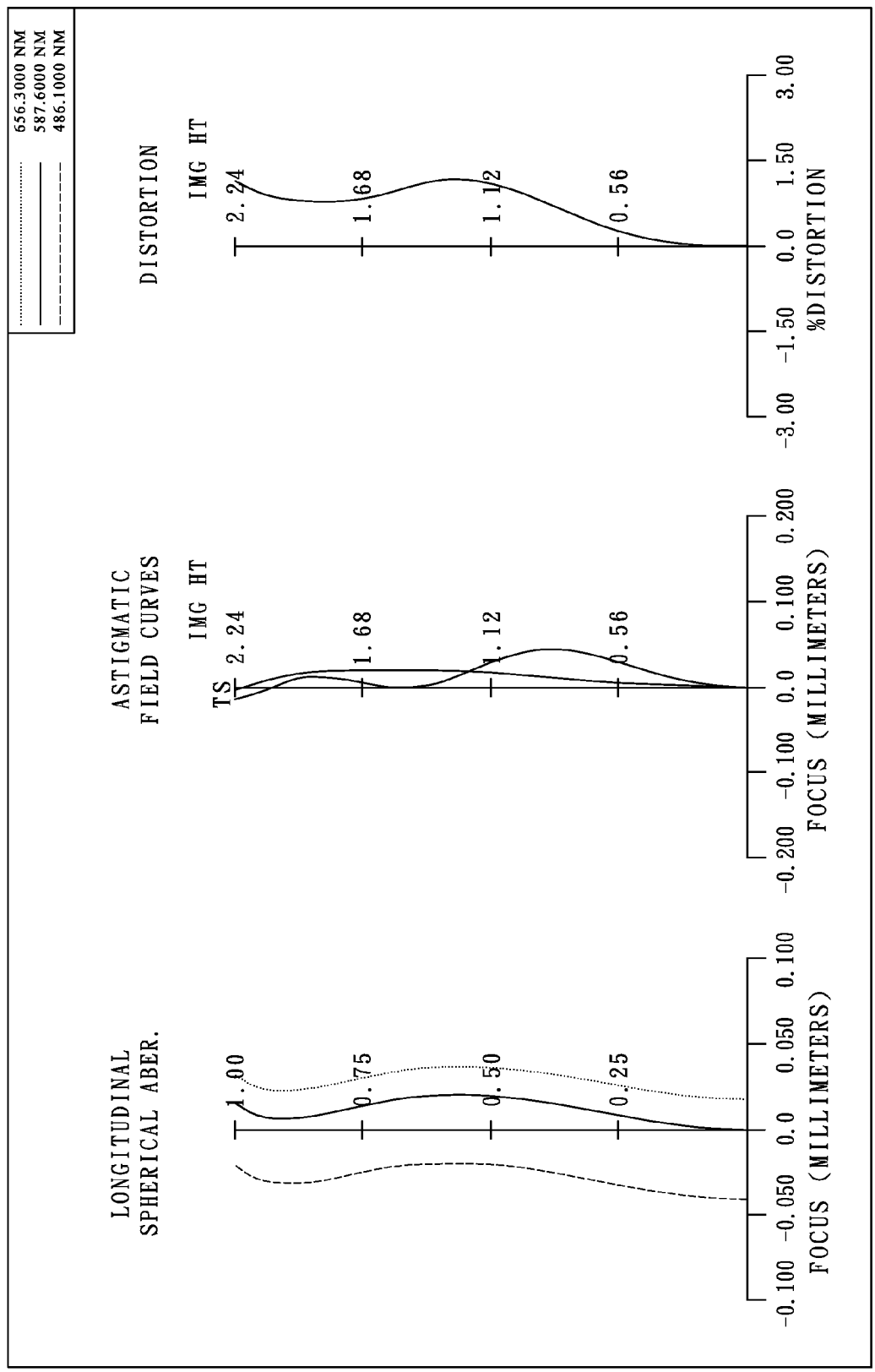
FIG. 8 shows the aberration curves of the fourth embodiment of the present invention.

FIG. 7 shows a photographing optical system in accordance with a fourth embodiment of the present invention, and FIG. 8 shows the aberration curves of the fourth embodiment of the present invention. The photographing optical system of the fourth embodiment of the present invention mainly comprises three lens elements, in order from the object side to the image side: a plastic first lens element 710 with positive refractive power having a convex object-side surface 711 and a concave image-side surface 712, the object-side and image-side surfaces 711 and 712 thereof being aspheric; a plastic second lens element 720 with negative refractive power having a convex object-side surface 721 and a concave image-side surface 722, the object-side and image-side surfaces 721 and 722 thereof being aspheric; a plastic third lens element 730 with negative refractive power having a convex object-side surface 731 and a concave image-side surface 732, the object-side and image-side surfaces 731 and 732 thereof being aspheric, at least one inflection point formed on the object-side surface 731 and image-side surface 732; wherein the photographing optical system provides a stop 700 disposed between an imaged object and the first lens element 710; wherein the photographing optical system further provides an IR filter 740 disposed between the image-side surface 732 of the third lens element 730 and an image plane 750; wherein the IR filter 740 is made of glass and has no influence on the focal length of the photographing optical system.

The equation of the aspheric surface profiles of the fourth embodiment has the same form as that of the first embodiment.

In the fourth embodiment of the present photographing optical system, the focal length of the photographing optical system is f, and it satisfies the relation: f=3.76 (mm).

In the fourth embodiment of the present photographing optical system, the f-number of the photographing optical system is Fno, and it satisfies the relation: Fno=2.80.

In the fourth embodiment of the present photographing optical system, half of the maximal field of view of the photographing optical system is HFOV, and it satisfies the relation: HFOV=30.7 deg.

In the fourth embodiment of the present photographing optical system, the Abbe number of the first lens element 710 is V1, the Abbe number of the second lens element 720 is V2, and they satisfy the relation: V1−V2=32.5.

In the fourth embodiment of the present photographing optical system, the thickness on the optical axis of the second lens element 720 is CT2, the focal length of the photographing optical system is f, and they satisfy the relation: CT2/f=0.07.

In the fourth embodiment of the present photographing optical system, the maximum thickness on the optical axis of individual lenses of the photographing optical system is CTmax, the minimum thickness on the optical axis of individual lenses of the photographing optical system is CTmin, and they satisfy the relation: CTmax/CTmin=3.93.

In the fourth embodiment of the present photographing optical system, the radius of curvature of the object-side surface 711 of the first lens element 710 is R1, the focal length of the photographing optical system is f, and they satisfy the relation: R1/f=0.40.

In the fourth embodiment of the present photographing optical system, the radius of curvature of the object-side surface 721 of the second lens element 720 is R3, the focal length of the photographing optical system is f, and they satisfy the relation: R3/f=0.53.

In the fourth embodiment of the present photographing optical system, the radius of curvature of the object-side surface 711 of the first lens element 710 is R1, the radius of curvature of the image-side surface 712 of the first lens element 710 is R2, and they satisfy the relation: R1/R2=0.34.

In the fourth embodiment of the present photographing optical system, the radius of curvature of the object-side surface 731 of the third lens element 730 is R5, the radius of curvature of the image-side surface 732 of the third lens element 730 is R6, and they satisfy the relation: R5/R6=1.64.

In the fourth embodiment of the present photographing optical system, the focal length of the photographing optical system is f, the focal length of the first lens element 710 is f1, and they satisfy the relation: f/f1=0.98.

In the fourth embodiment of the present photographing optical system, the focal length of the photographing optical system is f, the focal length of the second lens element 720 is f2, and they satisfy the relation: f/f2=−0.10.

In the fourth embodiment of the present photographing optical system, the focal length of the photographing optical system is f, the focal length of the third lens element 730 is f3, and they satisfy the relation: |f/f3|=0.25.

In the fourth embodiment of the present photographing optical system, the photographing optical further provides an electronic sensor for image formation at the image plane 750, the distance on the optical axis between the stop 700 and the electronic sensor is SL, the distance on the optical axis between the object-side surface 711 of the first lens element 710 and the electronic sensor is TTL, and they satisfy the relation: SL/TTL=1.00.

In the fourth embodiment of the present photographing optical system, the distance on the optical axis between the object-side surface 711 of the first lens element 710 and the electronic sensor is TTL, half of the diagonal length of the effective pixel area of the electronic sensor is ImgH, and they satisfy the relation: TTL/ImgH=1.83.

The detailed optical data of the fourth embodiment is shown in FIG. 17 (TABLE 7), and the aspheric surface data is shown in FIG. 18 (TABLE 8), wherein the units of the radius of curvature, the thickness and the focal length are expressed in mm, and HFOV is half of the maximal field of view.

Figure 9:
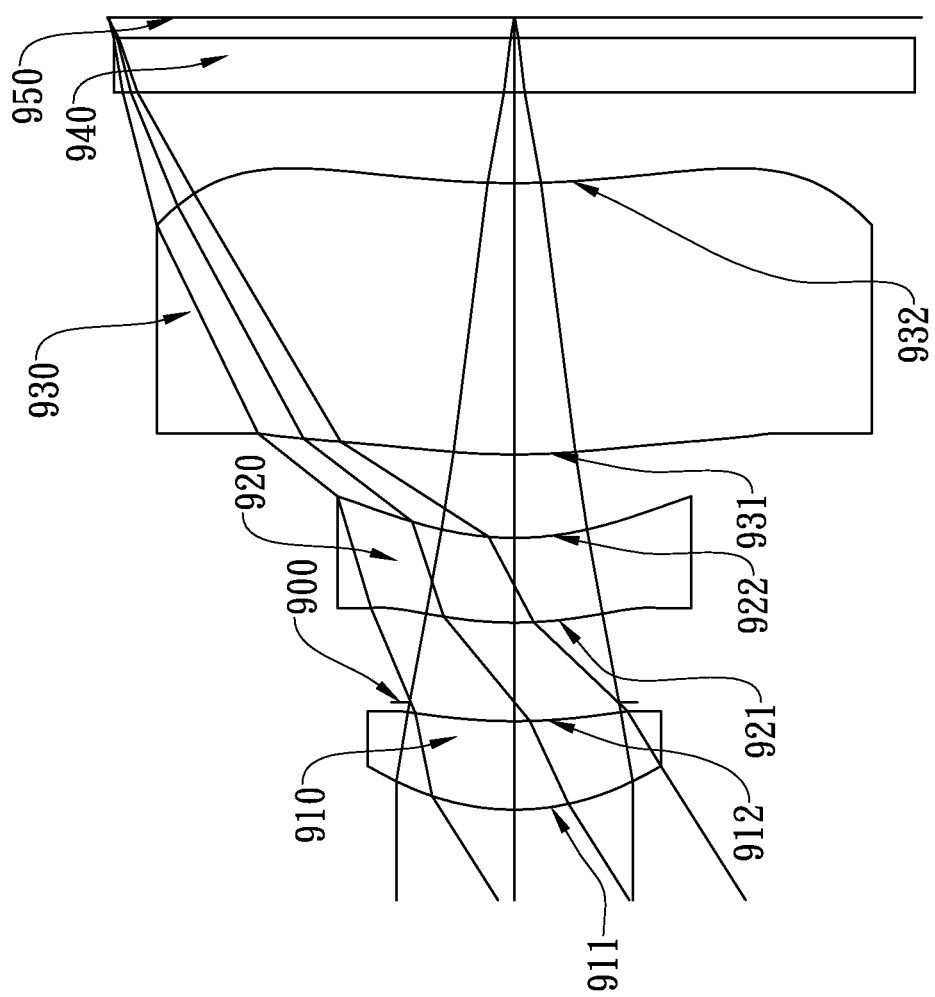
FIG. 9 shows a photographing optical system in accordance with a fifth embodiment of the present invention.
Figure 10:
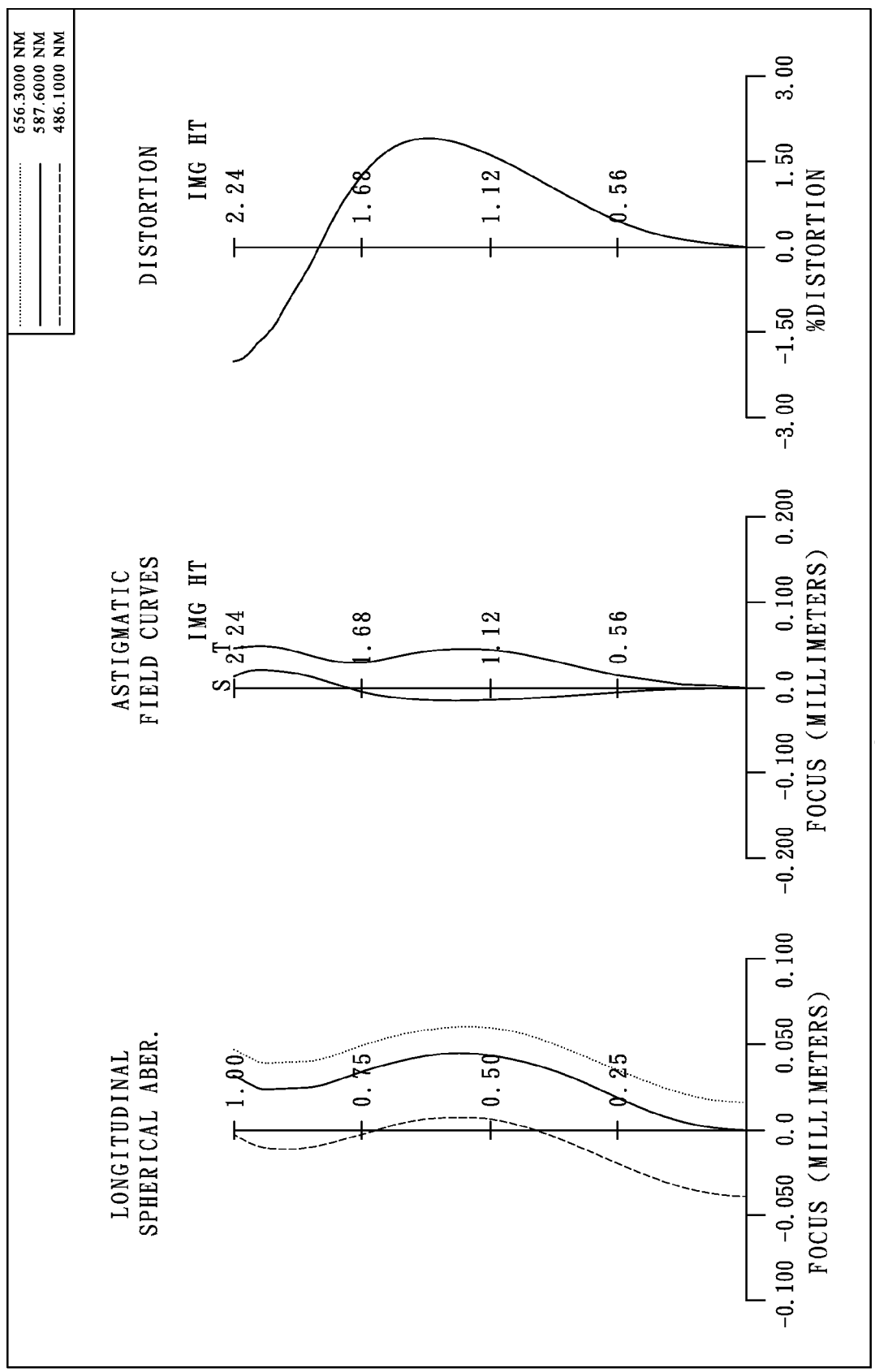
FIG. 10 shows the aberration curves of the fifth embodiment of the present invention.

FIG. 9 shows a photographing optical system in accordance with a fifth embodiment of the present invention, and FIG. 10 shows the aberration curves of the fifth embodiment of the present invention. The photographing optical system of the fifth embodiment of the present invention mainly comprises three lens elements, in order from the object side to the image side: a plastic first lens element 910 with positive refractive power having a convex object-side surface 911 and a concave image-side surface 912, the object-side and image-side surfaces 911 and 912 thereof being aspheric; a plastic second lens element 920 with negative refractive power having a convex object-side surface 921 and a concave image-side surface 922, the object-side and image-side surfaces 921 and 922 thereof being aspheric; a plastic third lens element 930 with positive refractive power having a convex object-side surface 931 and a concave image-side surface 932, the object-side and image-side surfaces 931 and 932 thereof being aspheric, at least one inflection point formed on the object-side surface 931 and image-side surface 932; wherein the photographing optical system provides a stop 900 disposed between the first lens element 910 and the second lens element 920; wherein the photographing optical system further provides an IR filter 940 disposed between the image-side surface 932 of the third lens element 930 and an image plane 950; and wherein the IR filter 940 is made of glass and have no influence on the focal length of the photographing optical system.

The equation of the aspheric surface profiles of the fifth embodiment has the same form as that of the first embodiment.

In the fifth embodiment of the present photographing optical system, the focal length of the photographing optical system is f, and it satisfies the relation: f=3.67 (mm).

In the fifth embodiment of the present photographing optical system, the f-number of the photographing optical system is Fno, and it satisfies the relation: Fno=2.80.

In the fifth embodiment of the present photographing optical system, half of the maximal field of view of the photographing optical system is HFOV, and it satisfies the relation: HFOV=32.2 deg.

In the fifth embodiment of the present photographing optical system, the Abbe number of the first lens element 910 is V1, the Abbe number of the second lens element 920 is V2, and they satisfy the relation: V1−V2=32.5.

In the fifth embodiment of the present photographing optical system, the thickness on the optical axis of the second lens element 920 is CT2, the focal length of the photographing optical system is f, and they satisfy the relation: CT2/f=0.13.

In the fifth embodiment of the present photographing optical system, the maximum thickness on the optical axis of individual lenses of the photographing optical system is CTmax, the minimum thickness on the optical axis of individual lenses of the photographing optical system is CTmin, and they satisfy the relation: CTmax/CTmin=3.21.

In the fifth embodiment of the present photographing optical system, the radius of curvature of the object-side surface 911 of the first lens element 910 is R1, the focal length of the photographing optical system is f, and they satisfy the relation: R1/f=0.38.

In the fifth embodiment of the present photographing optical system, the radius of curvature of the object-side surface 921 of the second lens element 920 is R3, the focal length of the photographing optical system is f, and they satisfy the relation: R3/f=0.56.

In the fifth embodiment of the present photographing optical system, the radius of curvature of the object-side surface 911 of the first lens element 910 is R1, the radius of curvature of the image-side surface 912 of the first lens element 910 is R2, and they satisfy the relation: R1/R2=0.46.

In the fifth embodiment of the present photographing optical system, the radius of curvature of the object-side surface 931 of the third lens element 930 is R5, the radius of curvature of the image-side surface 932 of the third lens element 930 is R6, and they satisfy the relation: R5/R6=0.71.

In the fifth embodiment of the present photographing optical system, the focal length of the photographing optical system is f, the focal length of the first lens element 910 is f1, and they satisfy the relation: f/f1=0.87.

In the fifth embodiment of the present photographing optical system, the focal length of the photographing optical system is f, the focal length of the second lens element 920 is f2, and they satisfy the relation: f/f2=−0.18.

In the fifth embodiment of the present photographing optical system, the focal length of the photographing optical system is f, the focal length of the third lens element 930 is f3, and they satisfy the relation: |f/f3|=0.20.

In the fifth embodiment of the present photographing optical system, the photographing optical further provides an electronic sensor for image formation at the image plane 950, the distance on the optical axis between the stop 900 and the electronic sensor is SL, the distance on the optical axis between the object-side surface 911 of the first lens element 910 and the electronic sensor is TTL, and they satisfy the relation: SL/TTL=0.86.

In the fifth embodiment of the present photographing optical system, the distance on the optical axis between the object-side surface 911 of the first lens element 910 and the electronic sensor is TTL, half of the diagonal length of the effective pixel area of the electronic sensor is ImgH, and they satisfy the relation: TTL/ImgH=1.91.

The detailed optical data of the fifth embodiment is shown in FIG. 19 (TABLE 9), and the aspheric surface data is shown in FIGS. 20A and 20B (TABLES 10A and 10B), wherein the units of the radius of curvature, the thickness and the focal length are expressed in mm, and HFOV is half of the maximal field of view.

It is to be noted that TABLES 1-10 (illustrated in FIGS. 11-20 respectively) show different data of the different embodiments, however, the data of the different embodiments are obtained from experiments. Therefore, any photographing optical system of the same structure is considered to be within the scope of the present invention even if it uses different data. The embodiments depicted above and the appended drawings are exemplary and are not intended to limit the claim scope of the present invention. TABLE 11 (illustrated in FIG. 21) shows the data of the respective embodiments resulting from the equations.

What is claimed is:

1. A photographing optical system comprising, in order from an object side to an image side:
    a first lens element with positive refractive power having a convex object-side surface;
    a second lens element with negative refractive power having a convex object-side surface and a concave image-side surface, at least one of the object-side and image-side surfaces thereof being aspheric;
    a third lens element having the object-side and image-side surfaces thereof being aspheric, at least one inflection point formed on the object-side surface and the image-side surface; and
    wherein the photographing optical system further provides a stop and an electronic sensor for image formation, the stop is disposed between an imaged object and the first lens element, there are three lens elements with refractive power; and wherein a radius of curvature on the object-side surface of the first lens element is R1, a radius of curvature on the object-side surface of the second lens element is R3, a focal length of the photographing optical system is f, a focal length of the second lens element is f2, an Abbe number of the first lens element is V1, an Abbe number of the second lens element is V2, a distance on the optical axis between the stop and the electronic sensor is SL, a distance on the optical axis between the object-side surface of the first lens element and the electronic sensor is TTL, and they satisfy the relations:

$0.20<R1/f<1.00;$ $0.30<R3/f<1.20;$ $30.5<V1-V2<40.0;$ $0.90<SL/TTL<1.20;$ and $-0.45<f/f2\leq-0.23.$ 2. The photographing optical system according to claim 1, wherein the image-side of the third lens element is concave, and the third lens element is made of plastic.

3. The photographing optical system according to claim 2, wherein the first lens element has a concave image-side surface.

4. The photographing optical system according to claim 3, wherein the radius of curvature on the object-side surface of the first lens element is R1, the focal length of the photographing optical system is f, and they satisfy the relation:

$0.30<R1/f<0.45.$

5. The photographing optical system according to claim 2, wherein the focal length of the photographing optical system is f, a focal length of the first lens element is f1, and they satisfy the relation:

$0.75<f/f1<1.20.$

6. The photographing optical system according to claim 5, wherein the focal length of the photographing optical system is f, the focal length of the first lens element is f1, and they satisfy the relation:

$0.85<f/f1<1.05.$

7. The photographing optical system according to claim 5, wherein a thickness on the optical axis of the second lens element is CT2, the focal length of the photographing optical system is f, and they satisfy the relation:

$0.04<CT2/f<0.12.$

8. The photographing optical system according to claim 1, wherein the focal length of the photographing optical system is f, a focal length of the third lens element is f3, and they satisfy the relation:

$0.06<|f/f3|<0.35.$

9. The photographing optical system according to claim 8, wherein a radius of curvature on the object-side surface of the third lens element is R5, a radius of curvature on the image-side surface of the third lens element is R6, and they satisfy the relation:

$0.70<R5/R6<2.00.$

10. The photographing optical system according to claim 1, wherein the radius of curvature on the object-side surface of the second lens element is R3, the focal length of the photographing optical system is f, and they satisfy the relation:

$0.40<R3/f<0.70.$

11. The photographing optical system according to claim 1, wherein the distance on the optical axis between the object-side surface of the first lens element and the electronic sensor is TTL, half of the diagonal length of the effective pixel area on the electronic sensor is ImgH, and they satisfy the relation:

$TTL/ImgH<1.9.$

12. A photographing optical system comprising, in order from an object side to an image side:
    a first lens element with positive refractive power having a convex object-side surface and a concave image-side surface, the object-side and image-side surfaces thereof being aspheric;
    a second lens element with negative refractive power having a convex object-side surface and a concave image-side surface, the object-side and image-side surfaces thereof being aspheric;
    a third lens element having a convex object-side surface and a concave image-side surface, the object-side and image-side surfaces thereof being aspheric, at least one inflection point formed on the object-side and image-side surfaces; and
    wherein the photographing optical system further provides a stop and an electronic sensor for image formation, the stop is disposed between an imaged object and the second lens element, and there are three lens elements with refractive power; wherein a radius of curvature on the object-side surface of the first lens element is R1, a radius of curvature on the image-side surface of the first lens element is R2, a radius of curvature on the object-side surface of the second lens element is R3, a focal length of the photographing optical system is f, a focal length of the second lens element is f2, a distance on the optical axis between the stop and the electronic sensor is SL, a distance on the optical axis between the object-side surface of the first lens element and the electronic sensor is TTL, and they satisfy the relations:

$0.10 < R1/R2 < 0.50;$ $0.30 < R3/f < 4.50;$ $0.70 < SL/TTL < 1.20;$ and $-0.45 < f/f2 \leq -0.23.$ 13. The photographing optical system according to claim 12, wherein the first lens element is made of plastic.

14. The photographing optical system according to claim 13, wherein an Abbe number of the first lens element is V1, an Abbe number of the second lens element is V2, and they satisfy the relation:

$30.5 < V1 - V2 < 40.0.$

15. The photographing optical system according to claim 14, wherein the radius of curvature on the object-side surface of the second lens element is R3, the focal length of the photographing optical system is f, and they satisfy the relation:

$0.40 < R3/f < 0.70.$

16. The photographing optical system according to claim 12, wherein the focal length of the photographing optical system is f, a focal length of the first lens element is f1, the radius of curvature on the object-side surface of the second lens element is R3, and they satisfy the relation:

$0.75 < f/f1 < 1.20;$ $0.30 < R3/f < 1.20.$

17. The photographing optical system according to claim 16, wherein the stop is disposed between an imaged object and the first lens element, the distance on the optical axis between the stop and the electronic sensor is SL, the distance on the optical axis between the object-side surface of the first lens element and the electronic sensor is TTL, and they satisfy the relation:

$0.90 < SL/TTL < 1.20.$

18. The photographing optical system according to claim 17, wherein a thickness on the optical axis of the second lens element is CT2, the focal length of the photographing optical system is f, and they satisfy the relation:

$0.04 < CT2/f < 0.12.$

19. The photographing optical system according to claim 12, wherein the radius of curvature on the object-side surface of the first lens element is R1, the focal length of the photographing optical system is f, and they satisfy the relation:

$0.30 < R1/f < 0.45.$

20. The photographing optical system according to claim 19, wherein the focal length of the photographing optical system is f, a focal length of the third lens element is f3, and they satisfy the relation:

$0.06 < |f/f3| < 0.35.$

21. A photographing optical system comprising, in order from an object side to an image side:
    a first lens element with positive refractive power having a convex object-side surface;
    a second lens element with negative refractive power having a convex object-side surface and a concave image-side surface, at least one of the object-side and image-side surfaces thereof being aspheric;
    a third lens element with negative refractive power having at least one of the object-side and image-side surfaces thereof being aspheric; wherein there are three lens elements with refractive power;
    wherein a focal length of the photographing optical system is f, a focal length of the second lens element is f2, and they satisfy the relation:

$-0.45 < f/f2 \leq -0.23.$

22. The photographing optical system according to claim 21, wherein the third lens element has at least one inflection point formed on the object-side and image-side surfaces, a maximum thickness on the optical axis of all individual lens elements is CTmax, a minimum thickness on the optical axis of all individual lens elements is CTmin, and they satisfy the relation:

$3.0 < CTmax/CTmin < 4.8.$

23. The photographing optical system according to claim 21, wherein the photographing optical system further provides a stop and an electronic sensor for image formation, the stop is disposed between an imaged object and the first lens element, a distance on the optical axis between the stop and the electronic sensor is SL, a distance on the optical axis between the object-side surface of the first lens element and the electronic sensor is TTL, the focal length of the photographing optical system is f, a focal length of the first lens element is f1, and they satisfy the relation:

$0.90 < SL/TTL < 1.20;$ $0.85 < f/f1 < 1.05.$

24. The photographing optical system according to claim 21, wherein the focal length of the photographing optical system is f, a focal length of the third lens element is f3, a radius of curvature on the object-side surface of the second lens element is R3, and they satisfy the relation:

$0.06 < |f/f3| < 0.35;$ $0.30 < R3/f < 1.20.$

25. The photographing optical system according to claim 21, wherein a radius of curvature on the object-side surface of the first lens element is R1, the focal length of the photographing optical system is f, a thickness on the optical axis of the second lens element is CT2, and they satisfy the relation:

$0.30 < R1/f < 0.45;$ $0.04 < CT2/f < 0.12.$

* * * * *